Aug. 13, 1968    SHINJI KURIHARA    3,396,768
APPARATUS AND METHOD FOR SEPARATING MEAT FROM BONE
Filed Jan. 7, 1966    3 Sheets-Sheet 3

*INVENTOR.*
SHINJI KURIHARA
BY Kurt Kelman
AGENTS

United States Patent Office 3,396,768
Patented Aug. 13, 1968

3,396,768
APPARATUS AND METHOD FOR SEPARATING MEAT FROM BONE
Shinji Kurihara, Fukuyama-shi, Japan, assignor to Bibun Machine Construction Co., Ltd., Fukuyama, Hiroshima Prefecture, Japan, a corporation of Japan
Filed Jan. 7, 1966, Ser. No. 519,242
Claims priority, application Japan, Jan. 8, 1965, 40/924; June 28, 1965, 40/38,264
10 Claims. (Cl. 146—222)

ABSTRACT OF THE DISCLOSURE

An apparatus for processing meat-bearing material made of edible and inedible parts including a separator having a rotary perforated drum rotatable at a first speed, a means for feeding crushed meat-bearing material to the rotary drum at one area of its periphery, a resilient belt pressingly engaging an area of the drum periphery remote from the said one area, the belt being driven at a speed sufficiently in variance with said first speed such that the meat-bearing material is subjected to crushing and tearing forces so that edible meat-bearing material parts are forced into the interior of the drum.

---

The present invention relates to the processing of meat and fish, and more particularly to the separation of the edible part of meat-bearing material from the inedible part thereof so as to obtain controllably pure meat and waste fractions.

In the preparation of meat sausages, condensed soup stocks and the food products, it is important to separate bones, skin, sinews, veins, scales and the like from the meat to obtain a first-class product of acceptable taste. This has heretofore been done primarily by hand and/or has involved boiling of the meat-bearing material, which often impairs the taste, none of these methods being efficient or fully effective in removing such inedible parts as the sinew, for instance.

It is a primary object of this invention to provide an efficient and effective separation of edible and inedible parts of meat-bearing materials, such as chicken, beef, pork, veal, lamb or fish of all types.

This and other objects are obtained in accordance with the invention when crushed meat-bearing material is processed in at least one separator which includes a rotary perforated drum and a resilient belt means pressingly engaging an area of the drum periphery. A means is arranged for feeding crushed meat-bearing material to the rotary drum at another area of its periphery, and the rotary drum and belt means are operated at different speeds, the belt means forming a nip with the rotary drum. Means is provided for discharging an edible meat-bearing material part from the interior of the drum as well as for discharging material not pressed by the belt means into the drum interior from the nip.

A crusher means is provided for receiving meat-bearing material including edible and inedible parts, and means is arranged for delivering crushed meat-bearing material from the crusher means to the other area of the drum periphery. Also, a straining means receives the edible meat-bearing material part from the interior of the drum.

In the method of the invention, the crushed meat-bearing material portion of a size small enough to pass through the perforations of the rotary drum enters its interior while a portion of the material of a larger size is fed to another area of the drum periphery where it is resiliently pressed and frictionally moved againt another area of the perforated drum periphery to comminute some of the larger size material sufficiently to be pressed into the drum.

The above and other objects, advantages and features of the present invention will become more apparent in the following detailed description of certain embodiments thereof, taken in conjunction with the accompanying drawing wherein FIG. 1 is a schematic perspective view of an embodiment of an apparatus according to this invention and omitting some structural parts of individual portions shown in detail in other views;

Figure 1:
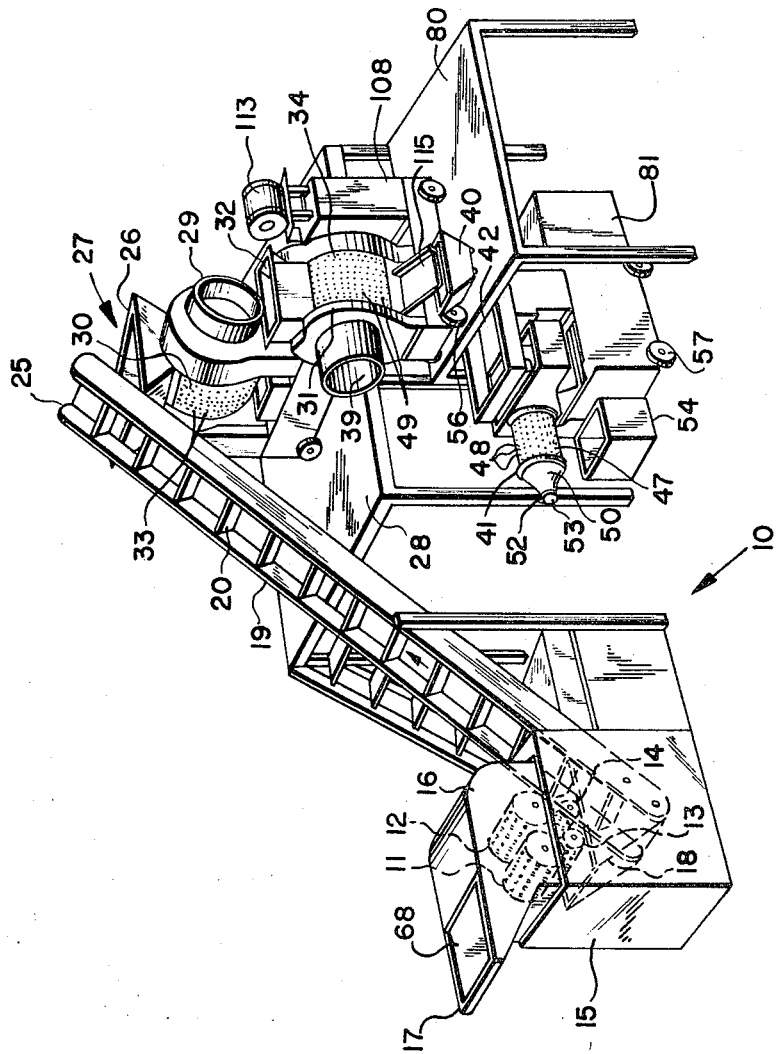
Figure 2:
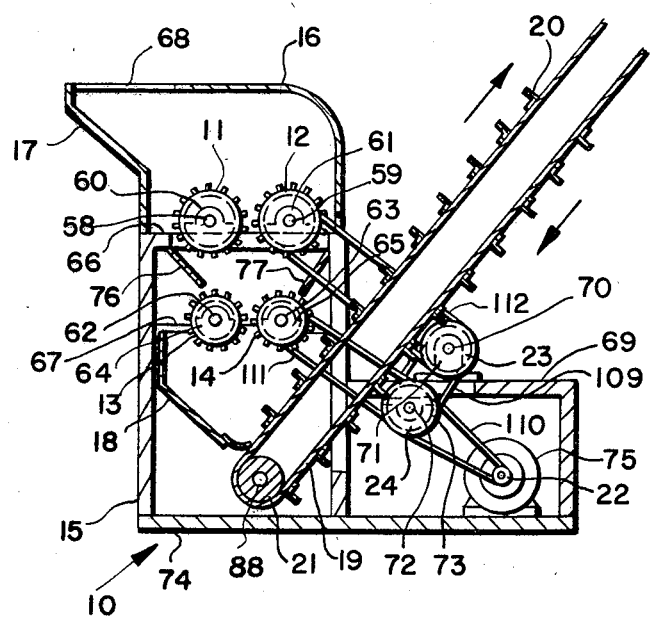
FIG. 2 is a schematic side view, partly in section, of the crusher portion of the apparatus of FIG. 1.

Referring now to the drawing and first to FIGS. 1 and 2, the apparatus is shown to include a crusher portion 10, a first separator portion 27, a second separator portion and a strainer portion, conveyor means being arranged between the crusher and the first separator portions to convey the crushed meat-bearing material.

As appears most clearly from FIG. 2, the crusher portion includes a housing 15 having a cover 16 defining an oblique wall 17 underneath a feed opening 68, the oblique wall functioning as a chute for conveying meat-bearing material delivered through the feed opening to a first pair of crusher rolls 11, 12. The meat-bearing material to be processed in the apparatus is first crushed in the nip of rolls 11, 12 whence the crushed material is gravity-fed into a hopper defined by guide plates 76, 77 directing the crushed material to a second pair of similar crusher rolls 13, 14. Each of the crusher rolls has a multiplicity of crusher teeth and is mounted for rotation on shafts 58, 59 and 62, 63 in bearings 60, 61 and 64, 65, respectively. The rolls of each pair are mounted for rotation in opposite directions and their spacing is adjustable, with the nip of the second pair of rolls generally narrower than that of the first pair of rolls, so as to crush or grind the meat-bearing material as it is fed through the nips of the rotating rolls into hopper 18.

The bearings for the roll shafts are secured in housing 15 on supports 66 and 67, respectively, rolls 11 and 13 being mounted for free rotation while rolls 12 and 14 are driven and drive rolls 11 and 13. Electric motor 75 drives the rolls in the following manner:

Endless belt 112 connects roll 12 with pulley 23 mounted on shaft 70 journaled in bearing 7 which is supported on housing 69. This housing also supports the bearing 73 of shaft 72 on which pulley 24 is mounted. Transmission belt 109 operatively connects pulleys 23 and 24 while transmission belt 110 connects pulley 22 of motor 75 with pulley 24. Crusher roll 14 is connected to pulley 24 by belt 111.

The crushed meat-bearing material, which includes portions of meat already separated from their bones, is fed from hopper 18 to endless conveyor belt 19 which moves the crushed material upwardly, carrying a succession of carrier plates 20 to hold the material in position during its upward travels in the manner of a bucket conveyor. Side walls along the lateral edges of the conveyor prevent lateral displacement of the material from the conveyor. The conveyor belt is mounted on pulleys, bottom pulley 21 being mounted on driven shaft 88.

The discharge end 25 of the conveyor is positioned above hopper 26 of the first separator portion 27 of the apparatus for gravity-feeding the crushed material into the hopper. The support frame of the first separator portion is mounted for ready movement on little wheels on table 28 and has journaled therein below hopper 26 a rotating drum 30 having a multitude of intake openings 33. As the crushed material is fed into hopper 26, those pieces small enough to pass through openings 33 will enter into the interior of the drum, while larger pieces consisting primarily of bones, skin, large sinews and the like will remain as rejected waste material in the hopper for removal therefrom.

The small pieces of material entering into the interior of drum 30 will be continuously removed therefrom through discharge tube 29 wherefrom they are gravity-fed into hopper 32 of second separator portion 31.

Figure 3:
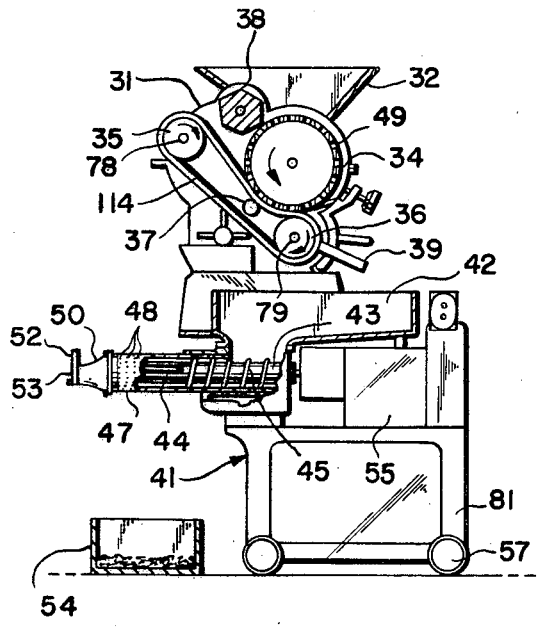
FIG. 3 is a schematic end view, partly in section and with parts broken away, of the second separator and strainer portions of the apparatus of FIG. 1.

As best shown in FIG. 3, the second separator portion also includes a rotary drum 34 having a multitude of intake holes 49. The perforated rotary drum 34 is mounted in the hopper 32 and forms a part of a continuously moving bottom thereof. Also journaled in the hopper is a rotary feeder 38 of polygonal cross section and rotating in a direction opposite to that of the rotary drum. Those pieces of meat not comminuted sufficiently to fall through intake holes 49 into the interior of the drum will thus be fed by the rotating polygonal feeder 38 to endless resilient belt 114 moving at a speed different from the speed of rotation of drum 34. The feeder 38 captures the material fed into the hopper 32, presses it against the drum 34 and forcibly feeds it between the belt 114 and the drum. The feeder overcomes the tendency of the material, caused by the natural presence of oily substances, not to enter between the aforesaid belt and drum. Belt 114 is mounted on pulleys 35 and 36 carried by shafts 78 and 79, respectively, and is pressed against drum 34 by roller 37. The belt moves in a direction opposite to that of drum 34 and forces the particles fed onto the belt by feeder 38 through intake holes 49 into the interior of the drum. Particles which resist the pressure of the belt as it moves past the rotating drum at a different speed, i.e. which are too large and/or too hard to be ground into sufficiently small pieces to enter through holes 49, such as bones, sinews, nails, etc., will be discharged from the second separator through chute 115 into waste receptacle 40. The practically pure meat particles entering into the interior of rotary drum 34 will be discharged therefrom through tube 39 which is in communication with the interior of the drum.

The second separator portion is mounted on wheels 56 for ready movement on table 80, a stand 108 supporting motor 113 which operates the drum 34 and belt 114.

Figure 4:
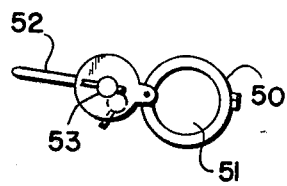
FIG. 4 is a top view of the lid for the strainer.

Finally, strainer 41 receives the pure meat particles from discharge tube 39 of the second separator portion, a hopper 42 being mounted underneath the discharge tube. The perforated strainer housing 47, which is provided with a multitude of strainer holes 48 of smaller diameter than that of holes 49, carries in its interior a screw conveyor 45 which moves the meat particles through the strainer. The strainer is movably mounted on a frame 81 which has wheels 57 and carries motor 55 which rotates shaft 43 at high speed. The meat particles are moved by the conveyor screw towards a discharge end 50 of the strainer, whose outlet opening 51 (see FIG. 4) is adjustable by means of lid 53 whose position may be adjusted in relation to the outlet opening by handle 52. Depending on this adjustment, any residual small pieces of bones, scales, sinews and the like will be discharged through the outlet opening of the strainer or will be retained in the strainer housing for discharge through strainer holes 48, thus determining the final purity of the strained meat product gravity-fed into receptacle 54 from the strainer.

It will be appreciated from a consideration of the above description that the various portions of the apparatus may be readily assembled and disassembled in any desired manner, depending on the type of meat or fish processed or the degree of processing desired, eliminating, if not needed, one or the other of the described portions. However, the second separator portion with its rotary drum and engaging belt moving past each other at different speeds is an essential part of the apparatus of this invention.

Figure 5:
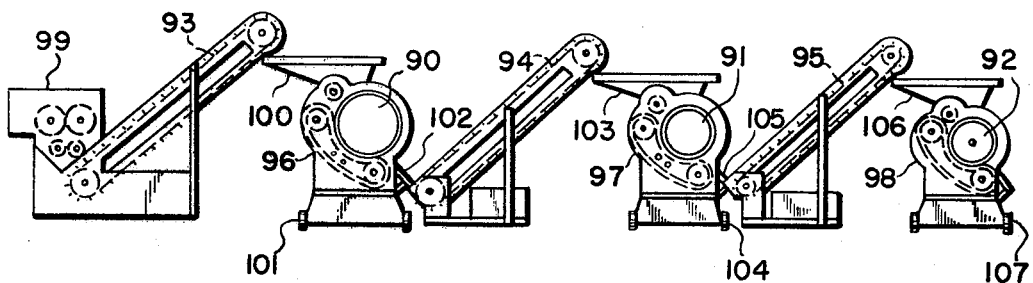
FIG. 5 is a schematic side view of another embodiment of the apparatus.

FIG. 5 illustrates a modified embodiment of the apparatus wherein three separators of the type shown in FIG. 3 are arranged in series. A crusher 99 of the type shown in FIG. 2 feeds crushed meat-bearing material to hopper 100 of separator drum 90 cooperating with resilient belt 96, conveyor 93 transporting the crushed material from the crusher to the separator. Like conveyors 94 and 95 are interposed between successive separators receiving the ever purer meat product discharged from the successive separators from discharge chute 102 and 105, respectively. The second separator in the series includes rotary drum 91 and belt 97, and the third separator includes rotary drum 92 and belt 98, hoppers 103 and 106 feeding the material to the respective separators. The three separators are mounted on wheels 101, 104 and 107, respectively, for ready mobility. The successive drums have increasingly smaller perforations so that an increasingly pure meat product is discharged from successive separators, small pieces of bones, sinews and veins being retained on the drums and discharged as waste products.

The term "meat-bearing material," as used throughout the specification and claims, includes all types of meat and fish, wherein edible connective tissues are mixed with bones, sinews, meat portions from the inedible parts. Examples of such materials are chickens, pork, beef, veal, lamb, and all sorts of fish.

With all such materials, the edible meat part is efficiently and effectively separated from the inedible parts, and the extent of such separation may be controlled by such factors as the size of the separator drum holes, the nip of the crusher rolls, and/or the number of separators used in series. If processed meat-bearing material is used as stock for soups, pressed ham, sausages and fish cake, for instance, the taste and texture of the end products depends largely on the purity of the meat used, pieces of bones, skin, sinews, veins and the like causing inferior taste. With the method and apparatus of the present invention, such waste materials may be fully separated in an effective manner and the purity of the processed meat may be carefully controlled, different quality meats being collectable from each separator, for instance, if a series of separators are used. Finally, the strainer used as the last stage produces a pure meat product almost without any inedible parts if its mesh size is about 1.3 mm. or less.

The following examples will illustrate the practice of the invention without in any way limiting the same thereto.

*Example 1*

The result of collecting meat from the bone/meat separator (FIG. 3) from a whole boiled chicken is indicated in Diagram No. 1. The drum mesh size was 2.8 mm. The material was run through the bone/meat separator twice and pure meat thus obtained was proved suitable as soup stock material.

DIAGRAM NO. 1

TOTAL WEIGHT: 69.400 kg, (100%)

| No. 1 Pure Meat | Loss | No. 1 Waste | Water |
|---|---|---|---|
| 47,440 kg | 4.030 kg | 17.930 kg | 3.400 kg |
| (68.4%) | (5.8%) | (25.8%) | (4.9%) |
| | | 21.330 kg | (30.7%) |
| No. 2 Pure Meat | Loss | No. 2 Waste | |
| 9.700 kg | 0.050 kg | 11.580 kg | |
| (14%) | (0.07%) | (16.63%) | |

TOTAL: Pure Meat: 82.4% − 4.9% = 77.5%
 Loss 5.87%
 Waste 16.63%

(77.5% plus 5.87% = 83.37 − Loss is regarded as part of pure meat.)

Example 2

Diagram No. 2 indicates the results of running a raw, whole chicken through the apparatus of FIG. 1. The mesh size of drum 34 was 2.8 mm. and in the case of the strainer it was 1.6 mm. The material was run through the bone/meat separator three times and then fed into the strainer.

DIAGRAM NO. 2

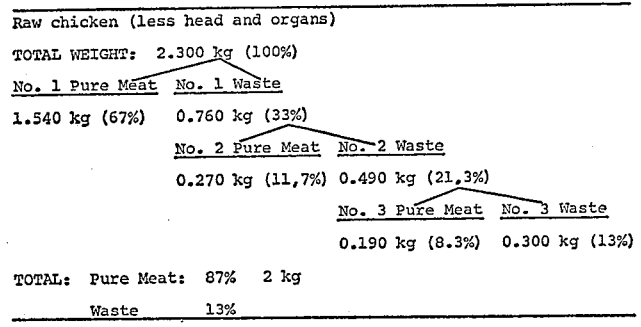

Raw chicken (less head and organs)
TOTAL WEIGHT: 2.300 kg (100%)
- No. 1 Pure Meat: 1.540 kg (67%)
- No. 1 Waste: 0.760 kg (33%)
  - No. 2 Pure Meat: 0.270 kg (11.7%)
  - No. 2 Waste: 0.490 kg (21.3%)
    - No. 3 Pure Meat: 0.190 kg (8.3%)
    - No. 3 Waste: 0.300 kg (13%)

TOTAL: Pure Meat: 87%  2 kg
Waste: 13%

The amount of meat 87% thus obtained is utilized as material for sausages and soup stock concentrate. On further straining, the final meat (2 kg.), 1.9 kg. meat (95%) and 0.1 kg. left-over (5%) were obtained. This last meat was excellent for soup stock material.

Example 3

The diagram No. 3 indicates results of running chicken necks only through the second and the third mechanisms. The mesh size of the drum was 4.8 mm. and in the case of the strainer it was 1.6 mm.

DIAGRAM NO. 3

| Necks Total Wt. | After Separation by Separator | | After Separation by Strainer | | Remarks |
|---|---|---|---|---|---|
| | Meat, kg. | Waste, kg. | Meat, kg. | Waste, kg. | |
| 2.05 kg | 1.35 (65.9%) | 0.7 (34.1%) | 1.04 (77%) | 0.31 (23%) | Strained meat can be utilized as material for soup stock concentrate. |

Example 4

Diagram No. 4 indicates results obtained by running pork heads alone through the first, second, and third mechanisms. The mesh sizes of the drum and the strainer were 4.8 mm. and 1.6 mm., respectively.

DIAGRAM NO. 4

| Run | Separation by Separator | | | | Separation by Strainer | | | |
|---|---|---|---|---|---|---|---|---|
| | Total, kg. | Meat, kg. | Waste, kg. | Dark Loss, kg. | Total, kg. | Meat, kg. | Waste, kg. | Dark Loss, kg. |
| 1st | 14.2 | 3.52 | 9.92 | 0.76 | 3.52 | 2.79 | 0.53 | 0.30 |
| 2d | 9.92 | 2.72 | 6.92 | 0.28 | 2.72 | 2.50 | 0.19 | 0.03 |
| 3d | 6.92 | 1.42 | 5.52 | 0.02 | 1.42 | 1.26 | 0.13 | 0.03 |
| Total | | 7.66 | | 1.02 | 7.66 | 6.55 | 0.85 | 0.36 |

The strained meat (6.55 kg. by the strainer) could be utilized for sausages. The rate of separation was 6.55 kg. ÷ 14.2 kg. = 46%.

Example 5

Diagram No. 5 indicates results obtained by running heads of the rays alone, which used to be discarded as waste, through the first, second, and third mechanisms. Mesh sizes used were 6 mm. for the meat collector and 3.2 mm. for the strainer.

DIAGRAM NO. 5

| Ray Heads, kg. | Separation by Separator | | | Separation by Strainer | | |
|---|---|---|---|---|---|---|
| | Meat, kg. | Waste, kg. | Dark Loss, kg. | Meat, kg. | Waste, kg. | Dark Loss, kg. |
| 100 | 55 | 40 | 5 | 38.5 | 13 | 3.5 |

The strained meat by the strainer could be utilized as feeds for fish-breeding.

Example 6

Indicated in Diagram No. 6 are the results of running the whole body of Alaska Pollacks (less heads and organs) through the second and third mechanisms. Mesh sizes of the collector and of the strainer were 3.8 mm. and 2.8 mm., respectively.

DIAGRAM NO. 6

| Alaska Pollack less head and organs, kg. | Separation by Separator | | | Separation by Strainer | | |
|---|---|---|---|---|---|---|
| | Meat, kg. | Waste, kg. | Dark Loss, kg. | Meat, kg. | Waste, kg. | Dark Loss, kg. |
| 100 | 70 | 30 | | 63 | 7 | |

The strained meat by the strainer was excellent as frozen ground meat for the fish-paste material. The left-over could be utilized for fried fish paste products.

As will be evident from the above, edible meat parts may be separated from inedible parts by a highly efficient mechanical operation and the following table will show the results obtained:

| Raw Material | | Usage | In What Form? |
|---|---|---|---|
| Chicken (As a whole, or necks, legs; may be boiled in some cases.) | Pure Meat | Soup Stock Concentrate; Spices | Raw; dried; or frozen. |
| | Left Over | Fertilizer | Raw; dried. |
| Pork (Head, backbone, tail, and ribs.) | Pure Meat | Fried Paste Product; Sausages | Raw; frozen. |
| | Left-Over | Fertilizer | Raw; dried. |
| Fish (Less head and organs.) | Pure Meat | Paste Products such as—"KAMABOKO" and CHIKUWAC; Fried Paste Product; Fish Meat Sausage; Fish Sticks. | Raw; frozen; or dried. |
| | Left-Over | Fertilizer | Raw; dried. |
| Fish | Pure Meat | Feeds for Fish Breeding | Raw; frozen; or dried. |
| | Left-Over | Feeds for Animals and Fertilizer | Raw; dried. |

What I claim is:

1. In an apparatus for processing meat-bearing material including edible and inedible parts, a separator including a rotary perforated drum arranged for rotation at a first speed, a means for feeding crushed meat-bearing material to said drum at one area of its periphery, a resilient belt means pressingly engaging an area of the drum periphery remote from said one area, and the belt means forming a nip with the rotary drum, means driving said belt means at a speed at said area of engagement with said drums sufficiently in variance with the peripheral speed of said drum such that said material is subjected to pressing and tearing forces to cause passage of an edible meat-bearing material part into the interior of said drum, means for discharging said edible meat-bearing material part from the interior of the drum, and means for discharging material not forced by the belt means into the interior of the perforated drum from the nip.

2. An apparatus for processing meat-bearing material to separate edible and inedible parts thereof, comprising
   (1) crusher means receiving meat-bearing material including edible and inedible parts;
   (2) a separator portion including
      (a) a rotary perforated drum arranged for rotation at a first speed,
      (b) a resilient belt means pressingly engaging an area of the drum periphery, and the belt means forming a nip with the rotary drum, means for driving said belt means at a speed at said area of engagement with said drum sufficiently in variance with the peripheral speed of said drum such that said material is subjected to pressing and tearing forces to cause passage of an edible meat-bearing material part into the interior of said drum,
      (c) means for discharging said edible meat-bearing material part from the interior of the drum, and
      (d) means for discharging material not forced by the belt means into the interior of the drum from the nip;
   (3) means for delivering crushed meat-bearing material from the crusher means to an area of the periphery of the rotary drum remote from an above said nip;
   (4) a straining means; and
   (5) means for delivering the edible meat-bearing material part from the interior of the drum to the straining means.

3. The apparatus of claim 2, wherein the crushing means includes a pair of crusher rolls forming a nip therebetween, a multitude of crusher teeth mounted over the peripheries of the crusher rolls, and said crusher rolls being arranged for rotation in opposite directions for feeding the crushed meat-bearing material from the nip between the rolls to the crushed meat-bearing material delivering means.

4. The apparatus of claim 3, wherein the width of the nip of the rolls is adjustable.

5. The apparatus of claim 1 wherein the separator includes a hopper arranged to receive the crushed meat-bearing material, the rotary drum forming a part of a moving bottom for said hopper and the moving belt means forming another part of the moving hopper bottom, and a rotary feeder engaging the drum periphery, the rotary feeder being arranged for rotation in a direction opposite to that of the drum for feeding material to the nip between the drum and the belt means.

6. The apparatus of claim 2, wherein the strainer means includes a perforated housing, the perforations of the strainer means housing being smaller than the perforation of the rotary drum, and a conveyor screw mounted in the housing for moving the edible meat-bearing material part delivered from the interior of the drum from an intake end of the housing to an output end.

7. The apparatus of claim 6, wherein the output end of the strainer means housing has an opening and a lid is mounted over the opening for adjustment thereof.

8. A method for separating edible and inedible parts of a crushed meat-bearing material, comprising the steps of feeding the crushed material containing the edible and inedible parts to one area of a perforated drum rotating at a first speed in order to permit a portion of the material of a size small enough to pass through the perforations of the drum to enter its interior, feeding the portion of the material of a larger size between a belt moving at a second speed and another area of the drum periphery such that the larger size material is subjected to pressing and tearing forces thereby comminuting some of the material sufficiently to be forced into the drum interior, discharging the material from the interior of the drum, and discharging the material remaining in said other area outside the drum.

9. The apparatus of claim 5 wherein said rotary feeder has a polygonal cross section.

10. In an apparatus for processing meat-bearing material including bone parts with flesh parts adhering thereto, a separator including a rotary perforated drum arranged for rotation at a first speed, a means for feeding said parts to said drum at one area of its periphery, a resilient belt means pressingly engaging an area of said drum periphery remote from said one area and forming a nip with said rotary drum, means driving said belt means at a speed at said area of engagement with said drums sufficiently in variance with the peripheral speed of said drum such that said flesh-bearing parts are subjected to pressing and tearing forces which disengage said flesh parts from said bone parts and cause passage of said flesh parts into the interior of said drum, means for discharging said flesh parts from the interior of the drum, and means for discharging material not forced by the belt means into the interior of the perforated drum from the nip.

References Cited

UNITED STATES PATENTS

| | | |
|---|---|---|
| 1,467,883 | 9/1923 | Sizer. |
| 2,236,843 | 4/1941 | Brykczynski et al. __ 146—76 X |
| 2,345,683 | 4/1944 | Owens _____ 146—76 X |
| 2,846,944 | 8/1958 | Willmes et al. _____ 100—53 |
| 3,057,387 | 10/1962 | Hyde et al. _____ 146—174 X |
| 3,266,542 | 8/1966 | Paoli _____ 146—76 |
| 3,266,543 | 8/1966 | Paoli _____ 146—222 |

W. GRAYDON ABERCROMBIE, *Primary Examiner.*